(12) United States Patent
Wabgaonkar et al.

(10) Patent No.: US 10,679,613 B2
(45) Date of Patent: Jun. 9, 2020

(54) SPOKEN LANGUAGE UNDERSTANDING SYSTEM AND METHOD USING RECURRENT NEURAL NETWORKS

(71) Applicant: Accenture Global Solutions Limited, Dublin (IE)

(72) Inventors: Harshawardhan Madhukar Wabgaonkar, Mumbai (IN); Shubhashis Sengupta, Bangalore (IN); Tirupal Rao Ravilla, Chittoor (IN); Sumitraj Ganapat Patil, Belgaum (IN); Poulami Debnath, Bangalore (IN); Sushravya G M, Bangalore (IN); Roshni Ramesh Ramnani, Bangalore (IN); Gurudatta Mishra, Dublin (IE); Moushumi Mahato, Bengaluru (IN); Mauajama Firdaus, Kolkata (IN)

(73) Assignee: Accenture Global Solutions Limited, Dublin (IE)

( * ) Notice: Subject to any disclaimer, the term of this patent is extended or adjusted under 35 U.S.C. 154(b) by 155 days.

(21) Appl. No.: 16/008,367

(22) Filed: Jun. 14, 2018

(65) Prior Publication Data
US 2019/0385595 A1 Dec. 19, 2019

(51) Int. Cl.
*G10L 15/16* (2006.01)
*G10L 15/06* (2013.01)
(Continued)

(52) U.S. Cl.
CPC ............ *G10L 15/16* (2013.01); *G06N 3/08* (2013.01); *G10L 15/063* (2013.01); *G10L 15/1815* (2013.01); *G10L 15/22* (2013.01)

(58) Field of Classification Search
CPC ... G10L 15/16; G10L 15/063; G10L 15/1815; G10L 15/22; G06N 3/08
See application file for complete search history.

(56) References Cited

U.S. PATENT DOCUMENTS 9,679,258 B2    6/2017 Mnih et al.
10,515,625 B1 *  12/2019 Metallinou ............. G10L 15/02
(Continued)

OTHER PUBLICATIONS

Kim et al., "ONENET: Joint domain, Intent, Slot Prediction for Spoken Language Understanding", IEEE, 2017, whole document (Year: 2017).*

(Continued)

*Primary Examiner* — Sonia L Gay
(74) *Attorney, Agent, or Firm* — Plumsea Law Group, LLC

(57) ABSTRACT

A system and method for spoken language understanding using recurrent neural networks ("RNNs") is disclosed. The system and method jointly performs the following three functions when processing the word sequence of a user utterance: (1) classify a user's speech act into a dialogue act category, (2) identify a user's intent, and (3) extract semantic constituents from the word sequence. The system and method includes using a bidirectional RNN to convert a word sequence into a hidden state representation. By providing two different orderings of the word sequence, the bidirectional nature of the RNN improves the accuracy of performing the above-mentioned three functions. The system and method includes performing the three functions jointly. The system and method uses attention, which improves the efficiency and accuracy of the spoken language understanding system by focusing on certain parts of a word sequence. The three functions can be jointly trained, which increases efficiency.

20 Claims, 6 Drawing Sheets

(51) Int. Cl.
*G10L 15/18* (2013.01)
*G10L 15/22* (2006.01)
*G06N 3/08* (2006.01)

(56) References Cited

U.S. PATENT DOCUMENTS

| | | |
|---|---|---|
| 2017/0140269 A1 | 5/2017 | Schaul et al. |
| 2017/0278018 A1 | 9/2017 | Mnih et al. |
| 2018/0052825 A1 | 2/2018 | Lipton et al. |
| 2018/0157638 A1* | 6/2018 | Li .......................... G10L 15/22 |
| 2019/0244603 A1* | 8/2019 | Angkititrakul ..... G10L 15/1815 |

OTHER PUBLICATIONS

Extended European Search Report dated Nov. 8, 2019 for European Patent Application No. EP19179183.9.
Bing Liu et al.: "Attention-Based Recurrent Neural Network Models for Joint Intent Detection and Slot Filling", http://arxiv.org, Cornell University Library, 201 Olin Library Cornell University Ithaca, NY 14853, Sep. 6, 2016, XP080724506, DOI: 10.21437/Interspeech.2016-1352.
Liyun Wen et al.: "Jointly Modeling Intent Identification and Slot Filling with Contextual and Hierarchical Information" In: Huang X., Jiang J., Zhao D., Feng Y., Hong Y. (eds.): "Natural Language Processing and Chinese Computing. NLPCC 2017. Lecture Notes in Computer Science", Jan. 5, 2018, Springer, Cham, Cham, China, XP055637909, ISSN: 0302-9743 vol. 10619, pp. 3-15, DOI: 10.1007/978-3-319-73618-1_1.
Xiaodong Zhang et al.: "A Joint Model of Intent Determination and Slot Filling for Spoken Language Understanding", Proceedings of the Twenty-fifth International Joint Conference on Artificial Intelligence (IJCAI-16), Jul. 25, 2016, pp. 2993-2999, XP055637799, New York, USA ; Retrieved from the Internet: url:https://pdfs.semanticscholar.org/1f9e/2d6dfleaaf04aebf428d9fa9a9ffc89e373c.pdf [retrieved on Oct. 31, 2019].
Hado van Hasselt et al., "Learning to Predict Independent of Span", published on Oct. 18, 2018; arXiv:1508.04582; (https://arxiv.org/pdf/1508.04582.pdf).
Hado van Hasselt et al., "Deep Reinforcement Learning With Double Q-learning", published on Dec. 8, 2015; arXiv: 1509.06461v3; (https://arxiv.org/pdf/1509.06461v3.pdf).
Long-ji Lin, "Self-Improving Reactive Agents Based on Reinforcement Learning, Planning and Teaching", published in May 1992, Machine Learning, vol. 8, Issue 3-4, pp. 293-321, Kluwer Academic Publishers (1992), Boston. (https://doi.org/10.1007/BF00992699).
Volodymyr Mnih et al., "Human-level control through deep reinforcement learning", published on Feb. 26, 2015; Nature, vol. 518, p. 529-533, Macmillan Publishers Limited (2015), (https://web.stanford.edu/class/psych209/Readings/MnihEtAlHassibis1-5NatureControlDeepRL.pdf).
Volodymr Mnih, "Machine Learning for Aerial Image Labeling", published 2013; thesis submitted in conformity with the requirement for the degree of Doctor of Philosophy; Graduate Department of Computer Science University of Toronto (2013).
Richard S. Sutton et al., "Reinforcement Learning : An Introduction", 2nd edition, in progress, A Bradford Book,The MIT Press.
Wang et al., "Dueling Network Architectures for Deep Reinforcement Learning", published Apr. 5, 2016; arXiv:1511.06581v3; (https://arxiv.org/pdf/1511.06581.pdf).
Hado van Hasselt, "Lecture 1: Introduction to Reinforcement Learning", (http://hadovanhasselt.worldpress.com/2016/01/12/ucl-course/).

* cited by examiner

SPOKEN LANGUAGE UNDERSTANDING SYSTEM AND METHOD USING RECURRENT NEURAL NETWORKS

CROSS-REFERENCE TO RELATED APPLICATION

This application is related to co-pending U.S. Patent Application Publication No. 2019/0385051, filed on Jun. 14, 2018 and published on Dec. 19, 2020, which is hereby incorporated by reference in its entirety.

TECHNICAL FIELD

The present disclosure generally relates to spoken language understanding. More specifically, the present disclosure generally relates to a system and method for spoken language understanding using recurrent neural networks ("RNNs").

BACKGROUND

Spoken language understanding systems interpret the word sequences of user utterances. For example, spoken language understanding systems are used by task-oriented virtual agents. Virtual agents are computer-generated agents that can interact with users. Goal- or task-oriented virtual agents may communicate with human users in a natural language and work with or help the users in performing various tasks. The tasks performed by a virtual agent can vary in type and complexity. Exemplary tasks include information retrieval, rule-based recommendations, as well as navigating and executing complex workflows. Informally, virtual agents may be referred to as "chatbots." Virtual agents may be used by corporations to assist customers with tasks such as booking reservations and working through diagnostic issues (e.g., for solving an issue with a computer). Using virtual agents may offer a corporation advantages by reducing operational costs of running call centers and improving the flexibility with which a company can increase the number of available agents that can assist customers.

Spoken language understanding systems help virtual agents determine what the human user desires. The spoken language understanding system converts the word sequences of user utterances to a hidden state representation of its meaning that the virtual agent can utilize. Then, the spoken language understanding system assigns a meaning to the hidden state representation that a downstream component of the virtual agent, such as a dialogue manager, can use to respond to the human user. Typically, a spoken language understanding system used in the context of task-oriented virtual agents performs three functions when processing a word sequence of a user utterance: (1) classify a user's speech act into a dialogue act category, (2) identify a user's intent, and (3) extract semantic constituents from the word sequence. The spoken language understanding system usually separately performs one of these three functions at a time. Performing one function at a time limits the speed with which the spoken language understanding system can process a user utterance. Additionally, performing one function at a time limits the accuracy of each function. Finally, separately training for each of the three functions limits the speed with which the training can be completed.

There is a need in the art for a system and method that addresses the shortcomings discussed above.

SUMMARY

A system and method for spoken (or natural) language understanding using RNNs is disclosed. The system and method solves the problems discussed above by using RNNs to jointly perform the following three functions when processing a word sequence of a user utterance: (1) classify a user's speech act into a dialogue act category, (2) identify a user's intent, and (3) extract semantic constituents from the word sequence (e.g., slot filling). Performing the three functions jointly increases the efficiency of the spoken language understanding system by eliminating the need to wait on one function before performing the next function. Furthermore, performing the three functions jointly also improves the accuracy of each function because the processing of each function can inform the processing of the other functions. Additionally, performing the three functions jointly can reduce computational resources (and/or computation time) by reducing the number of calculations that must be made through the neural network. These resource and time savings may be significant when the neural networks used are sufficiently large.

In addition to performing the three above-mentioned functions in an interactive way with one another, the system is trained for the three above-mentioned functions in a joint, interactive way. Training the three functions jointly is at least two to three times faster than training a system that trains the three functions separately.

The system and method includes using a bidirectional RNN to convert a word sequence, e.g., text of a user utterance, into a hidden state representation of its meaning. The bidirectional nature of the RNN provides two different orderings of the word sequence. The structure of the bidirectional RNN allows the next layer (e.g., the forward RNN) to have both backward and forward information about the word sequence at every time step. In other words, the bidirectional RNN passes information about the past and future of the word sequence to the next layer. This additional information improves the accuracy with which the spoken language understanding system performs the above three functions.

The system and method includes using a forward attention-based RNN to perform the above three functions jointly. The attention-based nature of the forward attention-based RNN improves the efficiency and accuracy of the spoken language understanding system by telling the forward attention-based RNN which portions of the hidden state representation to focus on. By focusing on more helpful portions of a hidden state representation rather than less helpful portions of the same, the forward attention-based RNN does not waste time on less helpful portions. Additionally, focusing on more helpful portions of a hidden state representation causes the spoken language understanding system to calculate a more accurate result in a shorter amount of time.

In some embodiments, the bidirectional RNN may comprise an LSTM or, alternatively, a GRU that controls how information is passed down from layer to layer of the spoken language understanding system. Similarly, in some embodiments, the forward RNN may comprise an LSTM or, alternatively, a GRU that controls how much information is passed down from layer to layer. Controlling how information is passed down from layer to layer increases the accuracy and efficiency of slot filling, finding the user intent, and classifying the word sequence by providing useful information during each time step while eliminating information that is irrelevant to the respective time step.

In one aspect, the disclosure provides a method of using a spoken language understanding system. The method may include receiving a word sequence. The word sequence may include a first word and a second word provided in a forward direction in which the first word comes before the second word. The method may include processing the word sequence through a bidirectional RNN to generate a bidirectional RNN output, including a forward hidden state representation and a backward hidden state representation for each word of the word sequence. The method may include applying a context vector to the bidirectional RNN output to generate a weighted bidirectional RNN output. The method may include processing the weighted bidirectional RNN output through a forward RNN to generate forward RNN output. The method may include using the forward RNN output to generate actual slot information, including slot names and slot values related to the word sequence. The method may include processing the forward RNN output through a first softmax classifier to determine an actual intent related to the word sequence. The method may include processing the forward RNN output through a second softmax classifier to determine an actual dialogue act category related to the word sequence.

In another aspect, generating the actual slot information occurs jointly with processing the forward RNN output through both the first softmax classifier and the second softmax classifier.

In another aspect, the above-mentioned forward RNN includes a first forward RNN component output; the bidirectional RNN includes a first bidirectional RNN component and a second bidirectional RNN component; and the first forward RNN component output is input into the second bidirectional RNN component.

In another aspect, the above-mentioned forward RNN includes a second forward RNN component output; the bidirectional RNN includes a third bidirectional RNN component; and the second forward RNN component output is input into the third bidirectional RNN component.

In another aspect, at least one of the above-mentioned forward RNN and the above-mentioned bidirectional RNN includes one of a long short-term memory ("LSTM") and a gated recurrent unit ("GRU") that controls how information is passed down from layer to layer of the spoken language understanding system.

In another aspect, the method may include training the spoken language understanding system by: (1) providing annotated training corpora to the bidirectional RNN, wherein the annotated training corpora provides expected output including at least one of expected slot information, an expected intent, and an expected dialogue act category, (2) calculating an error based on the difference between the expected output and an actual output, and (3) using the error to update a value of the context vector. The actual output may include at least one of the actual slot information, the actual intent, and the actual dialogue act category.

In another aspect, training the spoken language understanding system may further include using the error to update at least one of (a) a slot weight associated with using the forward RNN output to generate actual slot information, (b) an intent weight associated with processing the forward RNN output through a first softmax classifier to determine the actual intent related to the word sequence, and (c) a dialogue act category weight associated with processing the forward RNN output through a second softmax classifier to determine the actual dialogue act category related to the word sequence.

In another aspect, calculating the error based on the difference between the expected output and the actual output may include calculating at least one of (a) a slot error based on the difference between the expected slot information and the actual slot information, (b) an intent error based on the difference between the expected intent and the actual intent, and (c) an intent error based on the difference between the expected dialogue act category and the actual dialogue act category.

In yet another aspect, the disclosure provides a non-transitory computer-readable medium storing software that may comprise instructions executable by one or more computers which, upon such execution, cause the one or more computers to use a spoken language understanding system to: (1) receive a word sequence, including a first word and a second word provided in a forward direction in which the first word comes before the second word; (2) process the word sequence through a bidirectional RNN to generate a bidirectional RNN output, including a forward hidden state representation and a backward hidden state representation for each word of the word sequence; (3) apply a context vector to the bidirectional RNN output to generate a weighted bidirectional RNN output; (4) process the weighted bidirectional RNN output through a forward RNN to generate forward RNN output; (5) use the forward RNN output to generate actual slot information, including slot names and slot values related to the word sequence; (6) process the forward RNN output through a first softmax classifier to determine an actual intent related to the word sequence; and (7) process the forward RNN output through a second softmax classifier to determine an actual dialogue act category related to the word sequence.

In another aspect, generating the actual slot information occurs jointly with processing the forward RNN output through both the first softmax classifier and the second softmax classifier.

In another aspect, the above-mentioned forward RNN includes a first forward RNN component output; the bidirectional RNN includes a first bidirectional RNN component and a second bidirectional RNN component; and the first forward RNN component output is input into the second bidirectional RNN component.

In another aspect, the above-mentioned forward RNN includes a second forward RNN component output; the bidirectional RNN includes a third bidirectional RNN component; and the second forward RNN component output is input into the third bidirectional RNN component.

In another aspect, at least one of the above-mentioned forward RNN and the above-mentioned bidirectional RNN includes one of an LSTM or a GRU that controls how information is passed down from layer to layer of the spoken language understanding system.

In another aspect, the instructions, upon execution, further cause the one or more computers to train the spoken language understanding system by: (1) providing annotated training corpora to the bidirectional RNN, wherein the annotated training corpora provides expected output including at least one of expected slot information, an expected intent, and an expected dialogue act category, (2) calculating an error based on the difference between the expected output and an actual output, and (3) using the error to update a value of the context vector. The actual output may include at least one of the actual slot information, the actual intent, and the actual dialogue act category.

In yet another aspect, the disclosure provides a spoken language understanding system, which comprises one or more computers and one or more storage devices storing instructions that may be operable, when executed by the one or more computers, to cause the one or more computers to: (1) receive a word sequence, including a first word and a second word provided in a forward direction in which the first word comes before the second word; (2) process the word sequence through a bidirectional RNN to generate a bidirectional RNN output, including a forward hidden state representation and a backward hidden state representation for each word of the word sequence; (3) apply a context vector to the bidirectional RNN output to generate a weighted bidirectional RNN output; (4) process the weighted bidirectional RNN output through a forward RNN to generate forward RNN output; (5) use the forward RNN output to generate actual slot information, including slot names and slot values related to the word sequence; (6) process the forward RNN output through a first softmax classifier to determine an actual intent related to the word sequence; and (7) process the forward RNN output through a second softmax classifier to determine an actual dialogue act category related to the word sequence.

In another aspect, generating the actual slot information occurs jointly with processing the forward RNN output through both the first softmax classifier and the second softmax classifier.

In another aspect, the above-mentioned forward RNN includes a first forward RNN component output; the bidirectional RNN includes a first bidirectional RNN component and a second bidirectional RNN component; and the first forward RNN component output is input into the second bidirectional RNN component.

In another aspect, the above-mentioned forward RNN includes a second forward RNN component output; the bidirectional RNN includes a third bidirectional RNN component; and the second forward RNN component output is input into the third bidirectional RNN component.

In another aspect, at least one of the above-mentioned forward RNN and the above-mentioned bidirectional RNN includes one of an LSTM or a GRU that controls how information is passed down from layer to layer.

In another aspect, the stored instructions are further operable, when executed by the one or more computers, to cause the one or more computers to train a model of the spoken language understanding system by: (1) providing annotated training corpora to the bidirectional RNN, wherein the annotated training corpora provides expected output including at least one of expected slot information, an expected intent, and an expected dialogue act category, (2) calculating an error based on the difference between the expected output and an actual output, and (3) using the error to update a value of the context vector. The actual output may include at least one of the actual slot information, the actual intent, and the actual dialogue act category.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

A system and method for spoken language understanding using RNNs is disclosed. As discussed in more detail below, the system and method can be used with a virtual agent. The system and method uses RNNs to jointly perform the following three functions when processing a word sequence of a user utterance: (1) classify a user's speech act into a dialogue act category, (2) identify a speaker's intent, and (3) extract semantic constituents from the word sequence. As previously mentioned, performing the three functions jointly increases the efficiency of the spoken language understanding system by eliminating the need to wait on one function before performing the next function. Also, performing the three functions jointly improves the accuracy of each function because the processing of each function can inform the processing of the other functions. As discussed in more detail below, the spoken language understanding system may include a single encoder shared by three decoders that perform the three functions. The three functions are interrelated such that the three functions influence and inform each other. In addition to performing the three above-mentioned functions in an interactive way with one another, the system is trained for the three above-mentioned functions in an interactive way. Thus, training the three functions jointly provides the technological improvement of training the joint system at least two to three times faster than training a system that trains the three functions separately.

An RNN is a type of neural network used to process sequences of inputs. Rather than having inputs that are independent of outputs, as in traditional neural networks, RNNs use previous output as input into a subsequent process. In other words, an RNN uses memory to input a first hidden state representation from a first component related to a first time step into a second component from a second time step.

The system and method includes using a bidirectional RNN to convert a word sequence, e.g., text version of a user utterance, into a hidden state representation of its meaning. The bidirectional nature of the RNN reads two different orderings of the word sequence, which improves the accuracy with which the spoken language understanding system performs the above three functions.

The spoken language understanding system includes using a forward attention-based RNN to perform the above three functions jointly. The attention-based nature of the forward attention-based RNN improves the efficiency and accuracy of the spoken language understanding system by telling the forward attention-based RNN which portions of the hidden state representation to focus on. In some embodiments, the disclosed RNNs can include an LSTM or, alternatively, a GRU to control how information is passed down from layer to layer of the spoken language understanding system. This way, old memories unrelated to future processes do not confuse the future processes.

Figure 1:
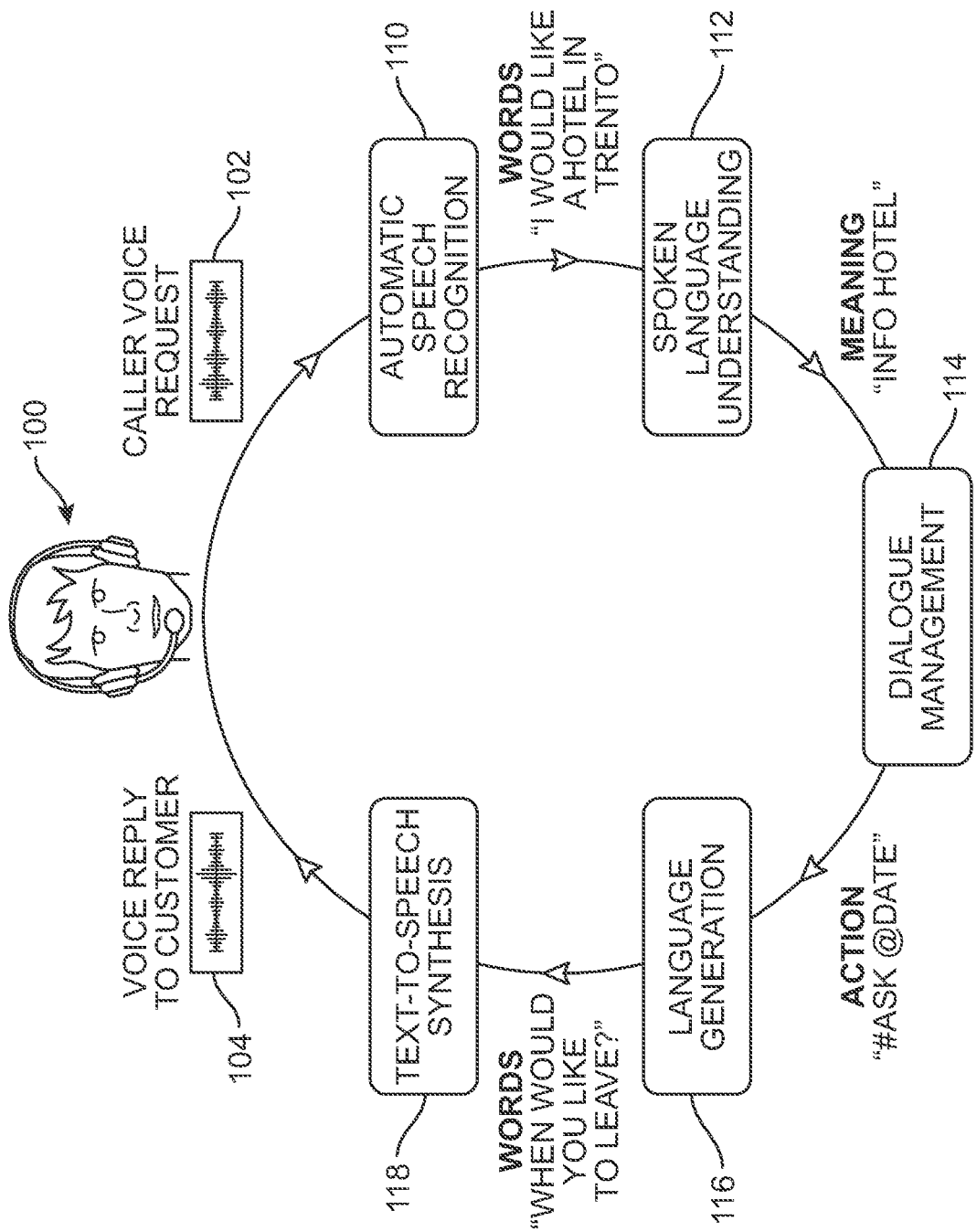
FIG. 1 is a schematic diagram of an embodiment of a virtual agent that corresponds with a customer.

In some embodiments, the spoken language understanding system comprises a sub-system of a virtual agent. The virtual agent takes in requests from a customer (or other end user) and processes the requests before responding back to the customer. To process requests from a customer and respond appropriately, the virtual agent may include multiple subsystems or modules that help solve various subtasks (e.g., voice recognition). For example, FIG. 1 shows an exemplary virtual agent 100 including a series of processes that occur between a request 102 (e.g., "caller voice request") and a response 104 (e.g., "voice reply to customer"). While the exemplary embodiment depicts a conversation that occurs as a phone call between virtual agent 100 and a customer, in other embodiments a virtual agent could communicate with a customer through other means including text-based communication (e.g., SMS or a chat-based application) and/or video communication (e.g., using Skype or Facetime).

Following the exemplary process characterized in FIG. 1, request 102 is first processed by an automatic speech recognition system 110. The goal of speech recognition system 110 is to convert spoken words into a string, or sequence, of words that can be used by systems downstream of speech recognition system 110. For example, speech recognition system 110 may convert a received audio signal (the customer's request over the phone) into the string, or sequence, of words "I would like a hotel in Trento." This sequence of words is then passed to a spoken language understanding system 112.

The goal of spoken language understanding system 112 is to extract the meaning of the string of words passed on from speech recognition system 110. For example, spoken language understanding system 112 may analyze the phrase "I would like a hotel in Trento" and determine that the customer is looking for information about a hotel. More specifically, in some embodiments, the spoken language understanding system takes in a word sequence as input and outputs (1) the dialogue act category (e.g., question, command, or information) of the word sequence, (2) the intent of the user, and (3) slot names and values. The intent corresponds to the topic of the word sequence (e.g., "flights", "hotels", "restaurants," etc.). Slots correspond to goal-relevant pieces of information. The slot name refers to a type or category of information that may be domain specific, such as "location" or "check-in date" in the context of booking a hotel. The slot values correspond to the particular choice for the slot name, such as "Trento" for the slot name "location."

The outputs of spoken language understanding system 112, which provide the extracted meaning of a word sequence, may be passed to dialogue management system 114. In the example shown in FIG. 1, the extracted information "info hotel" is provided to dialogue management system 114. However, it may be appreciated that in some cases the passed information could include the category, intent, and list of slot names/values corresponding to the original word sequence.

The goal of dialogue management system 114 is to track the current state of the dialogue between virtual agent 100 and the customer and to respond to the request in a conversational manner. Dialogue management system 114 generates an action based on the information received from spoken language understanding system 112, as well as the state of the dialogue with the customer.

The action immediately output by dialogue management system 114 may be symbolic in nature (e.g., "# ask @date"). This symbolic output is then converted into a natural language response by a language generation system 116. For example, language generation system 116 may receive input from dialogue management system 114 (e.g., "# ask @date") and output a string of words (e.g., "when would you like to leave?"). These words may then be converted into an audible response 104 by text-to-speech synthesis unit 118. It may be appreciated that this cycle represented by FIG. 1 may be repeated after each customer request (or other utterance) such that virtual agent 100 provides a response and continues a conversation with the customer until the customer goals have been met.

Figure 2:
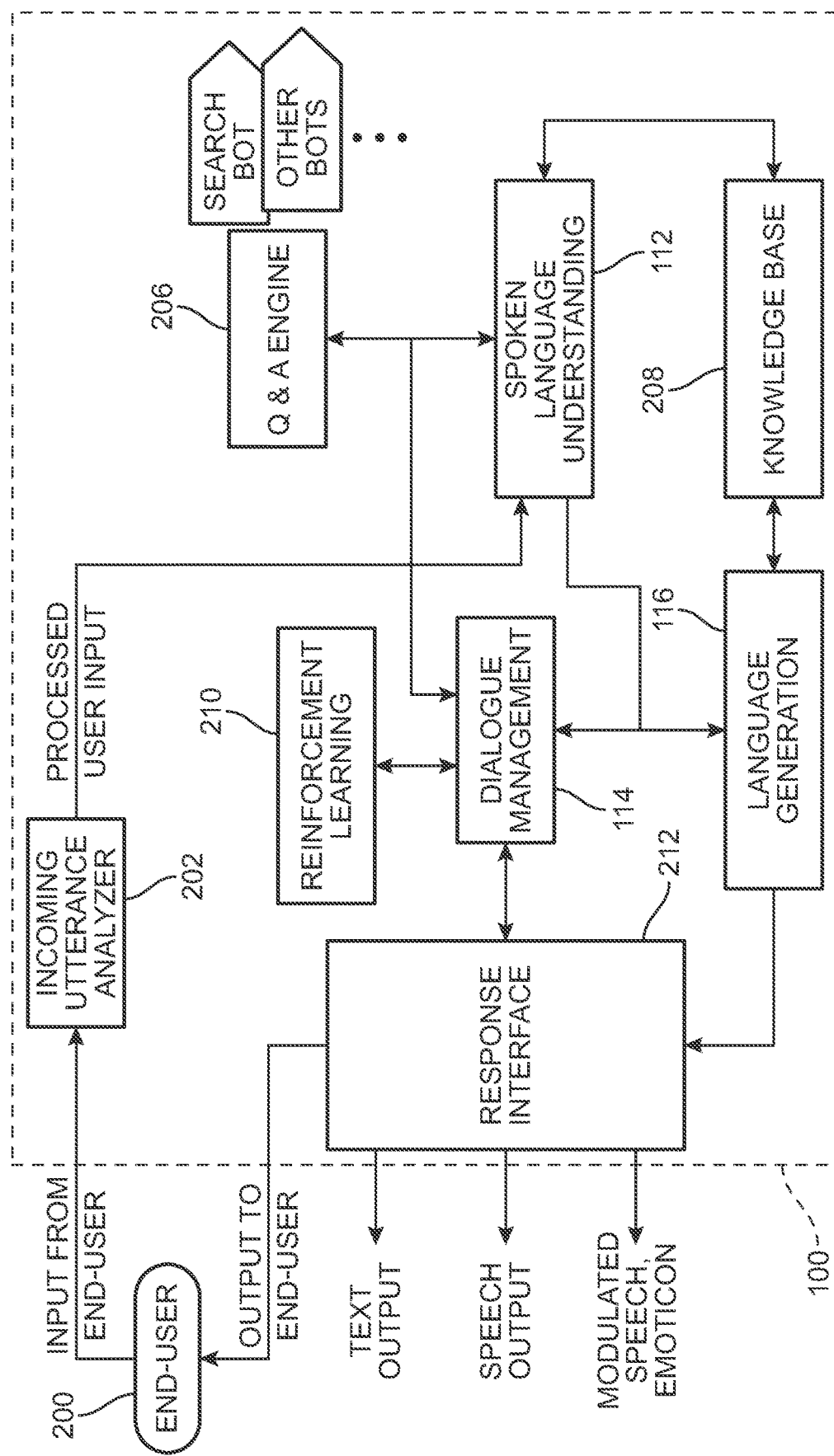
FIG. 2 is a schematic diagram of an embodiment of an architecture of a virtual agent.

A virtual agent may include additional subsystems and modules to achieve the goal of conversing with a customer and achieving the customer goals. For example, FIG. 2 is a schematic view of an embodiment of an architecture for virtual agent 100. Referring to FIG. 2, an end user 200 communicates with virtual agent 100. Communication may occur through various modes, including text-based chat programs that may run on a desktop, laptop or mobile device, telephone calls, audio and/or video calls transmitted over the internet (e.g., through services such as Skype) as well as other known modes of communication.

Input from end user 200 may be received and processed by an incoming utterance analyzer 202. In some cases, incoming utterance analyzer 202 may identify the type of input (e.g., audio, text, gestures, etc.) and direct the input to the proper sub-module (such as an automatic speech recognition module for audio input or a gesture interpreter for gesture-based inputs). The processed user input, which may take the form of strings of words, can then be passed to spoken language understanding system 112 to extract meaning from the end-user input.

Spoken language understanding system 112 may further communicate with dialogue management system 114. In some cases, spoken language understanding system 112 may also directly communicate with language generation system 116. Language generation system 116 can include modules to facilitate converting symbolic (or otherwise coded) output into a natural language format. Such modules could include a randomized machine utterance generator and a narrative generator. In some cases, natural language utterances may be generated using a Sequence Generative Adversarial Net (seqGAN).

A virtual agent can include provisions for gathering information. For example, in FIG. 2, spoken language understanding system 112 and/or dialogue management system 114 may communicate with a Q&A ("Question & Answer") Engine 206. Q&A Engine 206 can include submodules for identifying a question and determining if the question has been previously stored (or indexed) or if it is a new question. Q&A Engine 206 can also include provisions for searching for information on the web or in other systems accessible by virtual agent 100. For example, to look up the answer to a particular question, Q&A Engine 206 may use a search bot and/or other kinds of bots. In some cases, Q&A Engine 206 may access external services through an application protocol interface (API).

A virtual agent can include provisions for storing various kinds of information. For example, virtual agent 100 can include a knowledge base system 208. Knowledge base system 208 could include databases for storing a training collection, user and state info, and various kinds of domain specific knowledge (e.g., in the form of a graph).

A virtual agent can include provisions for learning to converse with an end user in a natural manner. For example, virtual agent 100 may include a reinforcement learning module 210. In the example of FIG. 2, dialogue management system 114, which may be trained using reinforcement learning processes as described above, can communicate directly with reinforcement learning module 210. In some cases, reinforcement learning module 210 may only be accessed during training sessions. In other cases, reinforcement learning module 210 may be accessed while virtual agent 100 is engaged with an end user, including a real customer. It may be appreciated that in some cases, other systems of virtual agent 100 could also communicate with, and utilize the resources of, reinforcement learning module 210.

Output to a user is provided at a response interface system 212. Response interface system 212 may communicate with dialogue management system 114 and/or language generation system 116. Information received from either of these units can be converted into a final output intended for end user 200. Response interface system 212 may therefore be capable of converting inputs from other systems into text, speech, and/or other kinds of expressions (such as modulated speech, emoticons, etc.).

A virtual agent and associated systems for communicating with a virtual agent may include one or more user devices, such as a computer, a server, a database, and a network. For example, a virtual agent running on a server could communicate with a user over a network. In some embodiments, the network may be a wide area network ("WAN"), e.g., the Internet. In other embodiments, the network may be a local area network ("LAN"). For example, in a more remote location far from a metropolitan area, the Internet may not be available. In yet other embodiments, the network may be a combination of a WAN and a LAN. In embodiments where a user talks to a virtual agent using a phone (e.g., a landline or a cell phone), the communication may pass through a telecom network and/or a wide area network.

The user device may be a computing device used by a user for communicating with a virtual agent. A computing device could be may a tablet computer, a smartphone, a laptop computer, a desktop computer, or another type of computing device. The user device may include a display that provides an interface for the user to input and/or view information. For example, a user could interact with a virtual agent using a program run on a laptop computer, such as a text-based chat program, a voice-based communication program, and/or a video-based communication program. Alternatively, in some cases, the user device could be a telephone (e.g., a landline, cell phone, etc.).

One or more resources of a virtual agent may be run on one or more servers. Each server may be a single computer, the partial computing resources of a single computer, a plurality of computers communicating with one another, or a network of remote servers (e.g., cloud). The one or more servers can house local databases and/or communicate with one or more external databases.

Figure 3:
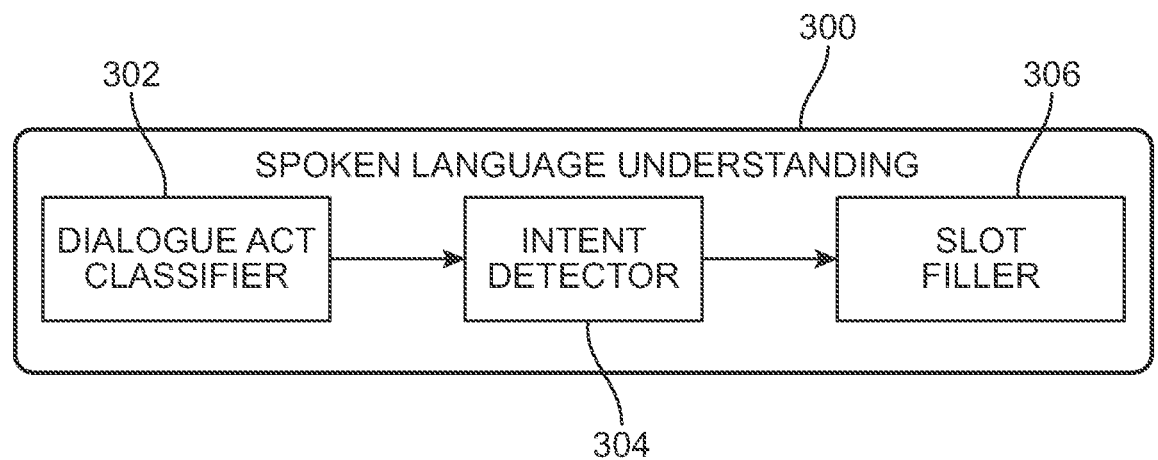
FIG. 3 is a schematic diagram of an embodiment of a spoken language understanding system.

As mentioned before, this disclosure focuses on a system and method of spoken language understanding. FIG. 3 shows a schematic diagram of an embodiment of a spoken language understanding system 300. The spoken language understanding system includes three main components: a dialogue act classifier, an intent detector, and a slot filler. For example, spoken language understanding system 300 includes a dialogue act classifier 302, an intent detector 304, and a slot filler 306. The dialogue act classifier classifies a word sequence into a dialogue act category. Rather than focus on the specific topic of the word sequence, the dialogue act category defines the type of communication indicated by the word sequence. Examples of dialogue act categories include question, greeting, command, and information. In one example, if a user says, "I want to fly from Seattle to Chicago," then the category is "command." In another example, if a user says, "I want to eat Chinese food that is medium-priced and from restaurants that are in the eastern part of the city," then the category is "command." In yet another example, if the user asks, "what is the weather like today?", then the category is "question."

The intent detector identifies the speaker's intent. The intent detector focuses on the specific topic of the word sequence to determine what it is the user desires. Examples of intents include flight, ground transportation, restaurant, and computer fault diagnosis. In one example, if a user says, "I want to fly from Seattle to Chicago," then the intent is "flight." In another example, if a user says, "I want to eat Chinese food that is medium-priced and from restaurants that are in the eastern part of the city," then the intent is "restaurant."

The slot filler extracts constituents from the word sequence. In other words, the slot filler finds goal-relevant pieces of information in the word sequence to determine which slot information, including slot names and slot values apply to the situation. For example, if a user says, "I want to fly from Seattle to Chicago," then the slots for this string of words could be "From-City" and "To_City." The value for the "From-City" slot is "Seattle" and the value for "To_City" is "Chicago." In another example, if a user says, "I want to eat Chinese food that is medium-priced and from restaurants that are in the eastern part of the city," the slots for this string of words could be "food", "price", and "area". The value for "food" is "Chinese". The value for "price" is "medium". The value for "area" is "Eastern".

Figure 4:
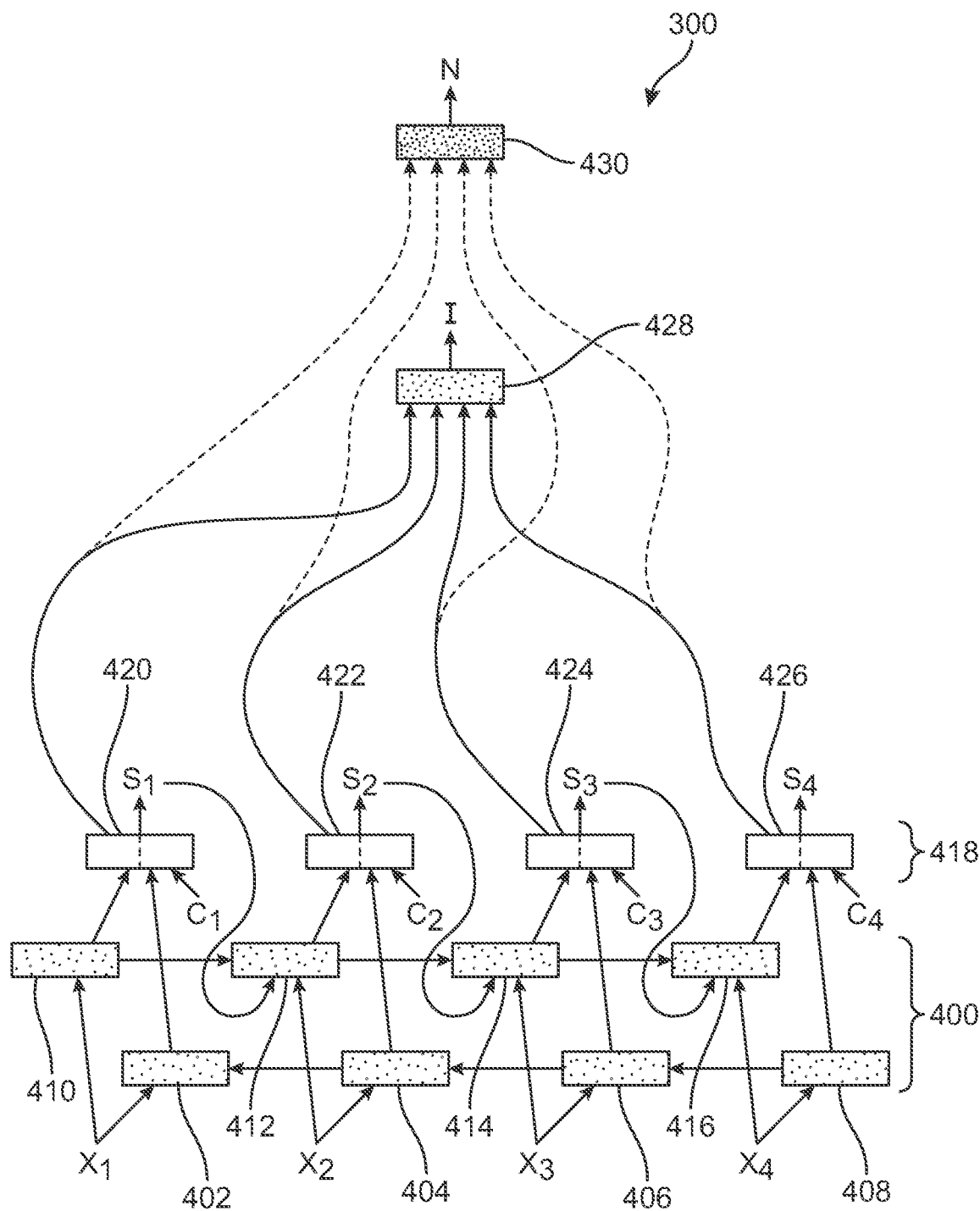
FIG. 4 is a schematic diagram of the relationship between the RNNs of a spoken language understanding system.

FIG. 4 shows a schematic diagram of the relationship between the RNNs of spoken language understanding system 300. The spoken language understanding system includes a bidirectional RNN, a forward RNN, a first softmax classifier, and a second softmax classifier. For example, spoken language understanding system 300 includes a bidirectional RNN (encoder) 400, a forward RNN (decoder) 418, a first softmax classifier (decoder) 428, and a second softmax classifier (decoder) 430. Forward RNN 418, first softmax classifier 428, and second softmax classifier 430 make up a decoder unit that serves as an output device. The three decoders of the decoder unit share the same encoder. For example, as shown in the embodiment of FIG. 4, forward RNN (decoder) 418, first softmax classifier (decoder) 428, and second softmax classifier (decoder) 430 share bidirectional RNN (encoder) 400. In some embodiments, the first softmax classifier may include a slot filler. In some embodiments, the second softmax classifier may include an intent detector. In some embodiments, the third softmax classifier may include a dialogue act classifier.

The bidirectional RNN comprises two unidirectional RNNs. Specifically, the bidirectional RNN includes a backward RNN including a first set of components that are run in backward time order and a forward RNN including a second set of components that are run in forward time order. For example, as shown in the embodiment of FIG. 4, bidirectional RNN 400 includes a first set of components including a first component 402, a second component 404, a third component 406, and a fourth component 408. In this example, the first set of components reads the word sequence in a backward time order and generates a sequence of hidden state representations ($bh_T, \ldots, bh_1$), which are shown as arrows directed away from the first set of components. Bidirectional RNN 400 includes a second set of components including a fifth component 410, a sixth component 412, a seventh component 414, and an eighth hidden start 416. In this example, the second set of components reads the word sequence in a forward time order and generates a sequence of hidden state representations ($fh_1, \ldots, fh_T$), which are shown as arrows directed away from the second set of components. This concept is described in more detail below with respect to a word sequence in FIG. 4.

Figure 5:
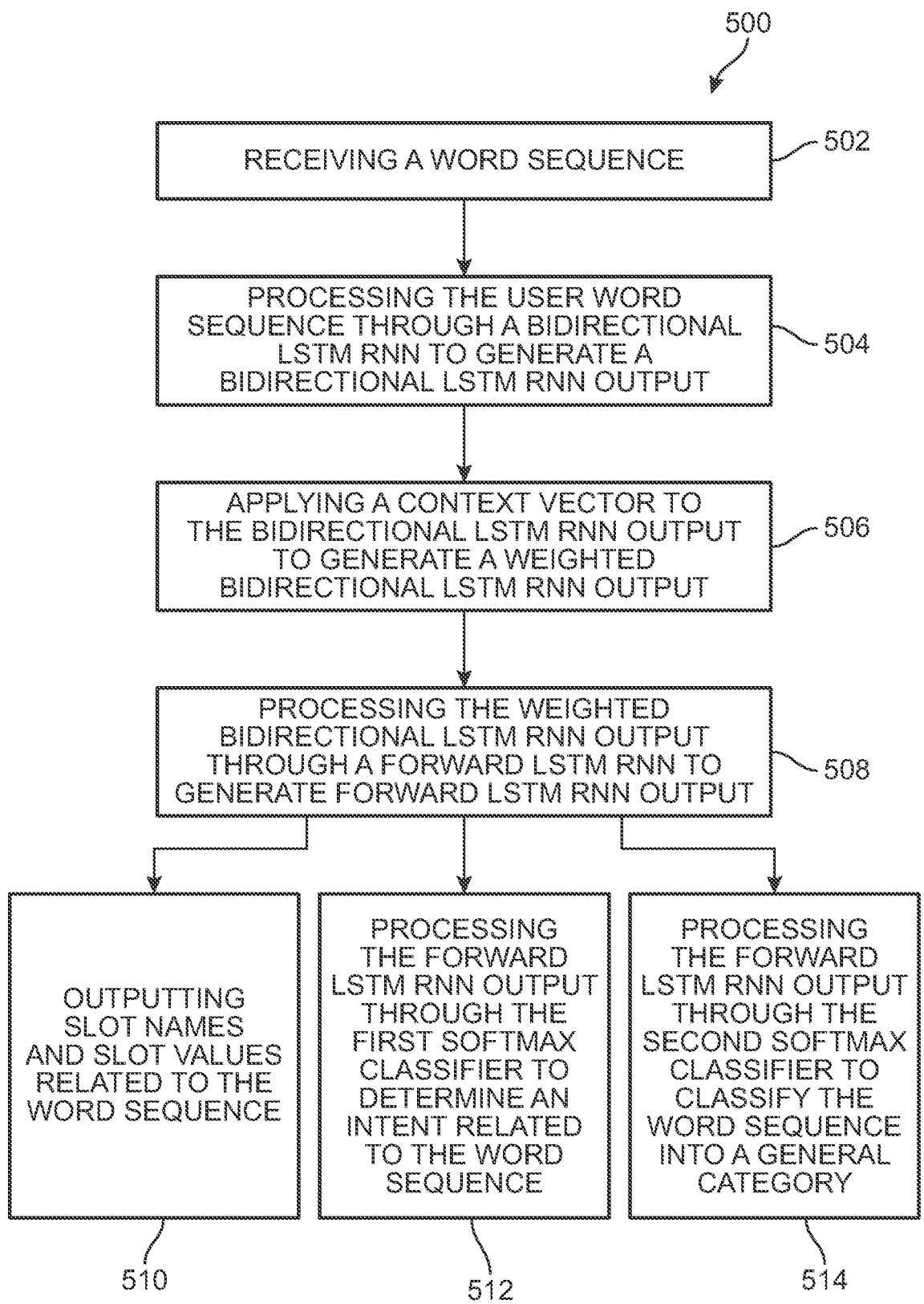
FIG. 5 is an embodiment of a method of spoken language understanding.

FIG. 5 shows an embodiment of a method of spoken language understanding 500. The method may include receiving a word sequence. For example, in the embodiment shown in FIG. 5, method 500 includes a step 502 of receiving a word sequence. The method may include processing the user word sequence through a bidirectional RNN to generate a bidirectional RNN output. For example, in the embodiment shown in FIG. 5, method 500 includes a step 504 of processing the user word sequence through a bidirectional RNN to generate a bidirectional RNN output. The method may include applying a context vector to the bidirectional RNN output to generate a weighted bidirectional RNN output. For example, in the embodiment shown in FIG. 5, method 500 includes a step 506 of applying a context vector to the bidirectional RNN output to generate a weighted bidirectional RNN output. The method may include processing the weighted bidirectional RNN output through a forward RNN to generate forward RNN output. For example, in the embodiment shown in FIG. 5, method 500 includes a step 508 of processing the weighted bidirectional RNN output through a forward RNN to generate forward RNN output.

The method may include using the forward RNN output to generate slot information, including slot names and slot values related to the word sequence. The method may further include outputting the slot information. For example, in the embodiment shown in FIG. 5, method 500 includes a step 510 of outputting slot names and slot values related to the word sequence. The method may include processing the forward RNN output through the first softmax classifier to determine an intent related to the word sequence. For example, in the embodiment shown in FIG. 5, method 500 includes a step 512 of processing the forward RNN output through the first softmax classifier to determine an intent related to the word sequence. The method may include processing the forward RNN output through the second softmax classifier to determine a dialogue act category related to the word sequence. For example, in the embodiment shown in FIG. 5, method 500 includes a step 514 of processing the forward RNN output through the second softmax classifier to classify the word sequence into a dialogue act category.

By sharing the same encoder, the last three steps mentioned above may be performed jointly. For example, as shown in FIG. 5, steps 510, 512, and 514 be performed jointly. Performing the three functions jointly increases the efficiency of the spoken language understanding system by eliminating the need to wait on one function before performing the next function. Additionally, performing the three functions jointly also improves the accuracy of each function because the processing of each function can inform the processing of the other functions. For example, the intent and the slots are closely interrelated, and each may be used to determine the other.

As previously mentioned, the method of spoken language understanding includes receiving a word sequence. In some embodiments, the word sequence may include a first word and a second word provided in a forward direction in which the first word comes before the second word. In other embodiments, the word sequence may include more than two words. For example, in one embodiment, the word sequence may include three words. In another example, in one embodiment, the word sequence may include between three and twenty words. The word sequence may include a word sequence that was converted from an acoustic sequence uttered by a human user. For example, in some embodiments, a speech recognition system converts spoken words into a word sequence that is received during step 502.

In the embodiment shown in FIG. 4, each word of the word sequence received by bidirectional RNN 400 is represented by $X_i$. For example, in an embodiment where the user says, "from Seattle to Chicago", $X_1$ is "from", $X_2$ is "Seattle", $X_3$ is "to", and $X_4$ is "Chicago." Each of the components of the first set of components aligns with each of the words of the word sequence in backward time order. By contrast, each of the components of the second set of components aligns with each of the words of the word sequence in forward time order. For example, as shown by arrows in the embodiment of FIG. 4, first component 402 and fifth component 410 are both aligned with $X_1$; second component 404 and sixth component 412 are both aligned with $X_2$; third component 406 and seventh component 414 are both aligned with $X_3$; and fourth component 408 and eighth component 416 are both aligned with $X_4$. The structure of the bidirectional RNN allows the next layer (e.g., the forward RNN) to have both backward and forward information about the word sequence at every time step. In other words, the bidirectional RNN passes information about the past and future of the word sequence to the next layer.

As previously mentioned, the spoken language understanding method may include processing the user word sequence through a bidirectional RNN to generate a bidirectional RNN output. The bidirectional RNN output may include a forward hidden state representation and a backward hidden state representation for each word of the word sequence. Each component of the bidirectional RNN may process the word aligned with the respective component, and generate a bidirectional RNN output (e.g., hidden state representation) for each word of the sequence. Because this bidirectional RNN output is fed to the next layer, the bidirectional RNN output is formatted as a hidden state representation that the next layer can understand and use. For example, as discussed above, the bidirectional RNN output of each component may include a hidden state representation, such as a vector.

When the bidirectional RNN output is fed to the next layer, the hidden state representation of the first set of components are concatenated with the second set of hidden state representations of the second set of components at each time step i to generate a final hidden state representation $h_i=[fh_i, bh_i]$ of the encoder. For example, in the embodiment shown in FIG. 4, the hidden state representations of first component 402 and fifth component 410 are concatenated at forward RNN 418. Similarly, the hidden state representations of second component 404 and sixth component 412 are concatenated at forward RNN 418. Third component 406 and seventh component 414 are concatenated at forward RNN 418. Fourth component 408 and eighth component 416 are concatenated at forward RNN 418. The last final hidden state representation $h_T=[fh_T, bh_T]$ of the encoder may carry information of the entire source sequence. In embodiments in which an attention mechanism is not used, the last final hidden state of the encoder would be input directly into the decoder.

The forward RNN includes a set of components. For example, in the embodiment shown in FIG. 4, forward RNN 418 includes a set of components including a ninth component 420, a tenth component 422, an eleventh component 424, and a twelfth component 426. As the next layer after the bidirectional RNN, the forward RNN receives the output from both the first and second sets of components of the bidirectional RNN. For example, as shown by the arrows in FIG. 4, output of first component 402 and fifth component 410 are both input into ninth component 420. Output of second component 404 and sixth component 412 are both input into tenth component 422. Output of second component 404 and sixth component 412 are both input into tenth component 422. Output of third component 406 and seventh component 414 are both input into eleventh component 416. Output of fourth component 408 and eighth component 416 are both input into twelfth component 426.

The forward RNN is attention based. Accordingly, the spoken language understanding method may include applying a context vector to the bidirectional RNN output to generate a weighted bidirectional RNN output. For example, in the embodiment shown in FIG. 5, method of spoken language understanding 500 includes step 506 of applying a context vector to the bidirectional RNN output to generate a weighted bidirectional RNN output. This step may include applying a context vector while processing the bidirectional RNN output through a forward RNN. The context vector is a weight that indicates how much focus should be placed on the forward hidden state representation and the backward hidden state representation for each word of the word sequence. For example, in the embodiment shown in FIG. 4, a context vector $C_i$ is fed into each component of forward RNN 418. More specifically, $C_1$ is fed into ninth component 420; $C_2$ is fed into tenth component 422; $C_3$ is fed into an eleventh component 424; and $C_4$ is fed into twelfth component 426. The context vector $C_i$ is a weight that tells each component of the forward RNN how much focus should be placed on the concatenated hidden states input from the previous layer. For example, if a user says, "from Seattle to Chicago," the words "Seattle" and "Chicago" may be selected for more focus. In such a case, assuming $X_1$ is "from", $X_2$ is "Seattle", $X_1$ is "to", and $X_1$ is "Chicago", $C_2$ and $C_4$ will have higher values than $C_1$ and $C_3$. The context vector $C_i$ can be computed as a weighted sum of the encoder hidden states representations, $h=(h_1, \ldots, h_T)$. The context vector $C_i = \Sigma_{j=1}^{T} \alpha_{i,j} h_j$ and $$\alpha_{i,j} = \frac{\exp(e_{i,j})}{\sum_{k=1}^{T} \exp(e_{i,k})}$$

where $e_{i,k}=g(S_{i-1}, h_k)$ and g is some parametric function, such as a linear function or a neural network. The values of parameters of g and the attention coefficients (alphas) are learned during the training process, as discussed in more detail below with respect to training. The context vector provides additional information to the first and second softmax classifiers, as discussed in more detail below with respect to the first and second softmax classifiers. The attention mechanism can also be applied to the first softmax classifier and the second softmax classifier to help place focus on appropriate areas when processing hidden state representations through the first softmax classifier and the second softmax classifier.

The spoken language understanding method may include processing the weighted bidirectional RNN output through a forward RNN to generate forward RNN output. For example, in the embodiment shown in FIG. 5, method of spoken language understanding 500 includes step 508 of processing the weighted bidirectional RNN output through a forward RNN to generate forward RNN output. In some embodiments, the bidirectional RNN may comprise an LSTM or, alternatively, a GRU that controls how information is passed down from layer to layer of the spoken language understanding system. For example, the LSTM or GRU may control how much information to pass forward and how much information to forget at each time step. Controlling how information is passed down from layer to layer increases the accuracy and efficiency of slot filling, finding the user intent, and classifying the word sequence by providing useful information during each time step while eliminating information that is irrelevant to the respective time step.

As previously mentioned, the spoken language understanding method may include outputting slot names and slot values related to the word sequence. These slot names and slot values are forward RNN output. For example, in the embodiment shown in FIG. 5, the forward RNN output is a hidden state representation, shown as $S_i$. At each time step i of the forward RNN (decoder), the forward RNN output is calculated as a function of the previous decoder hidden state representation $S_{i-1}$, the previous decoder-emitted label $y_{i-1}$ the encoder hidden sate representation $h_i$, and the context vector $C_i$. Thus, $S_i=f_{slt}(S_{i-1}, y_{i-1}, h_i, C_i)$. The forward RNN output includes slot names and slot values that apply to the situation (e.g., that are related to the word sequence). Using the example a user saying "from Seattle to Chicago" from above, the forward RNN uses attention to determine that the word sequence received by the bidirectional RNN includes a "From-City" slot, and that "Seattle" is the slot value for the "From-City" slot. In the same example, the forward RNN uses attention to determine that the word sequence received by the bidirectional RNN is a "To-City" slot, and that "Chicago" is the slot value for the "To-City" slot.

Referring to FIG. 4, the word $X_1$ is processed through first component 402 and fifth component 410, and the output of these components, along with context vector $C_1$, are input into ninth component 420. $S_1$ is the output of ninth component 420 that represents a slot name and slot value. Using the example of a user saying, "from Seattle to Chicago," $X_1$ is "from" and the associated slot value is 0.

The word $X_2$ is processed through second component 404 and sixth component 412, and the output of these components, along with context vector $C_2$, are input into tenth component 422. $S_2$ is the output of tenth component 422 that represents the slot name and slot value. Using the example of a user saying, "from Seattle to Chicago," $X_2$ is "Seattle" and the associated slot name is "From-City" with a slot value of "Seattle."

The word $X_3$ is processed through third component 406 and seventh component 414, and the output of these components, along with context vector $C_3$, are input into eleventh component 424. $S_3$ is the output of eleventh component 424 that represents the slot name and slot value. Using the example of a user saying, "from Seattle to Chicago," $X_3$ is "to" and the associated slot is 0.

The word $X_4$ is processed through fourth component 408 and eighth component 416, and the output of these components, along with context vector $C_4$, are input into twelfth component 426. $S_4$ is the output of twelfth component 426 that represents the slot name and slot value. Using the example of a user saying, "from Seattle to Chicago," $X_4$ is "Chicago" and the associated slot name is "To-City" with a slot value of "Chicago."

To provide more context when determining slot names and slot values, the output from a component of the forward RNN is provided as input to a component that comes later in forward time order in the second set of components of the bidirectional RNN. For example, as shown in the embodiment of FIG. 4, output $S_1$ is fed as input to sixth component 412, output $S_2$ is fed as input to seventh component 414, and $S_3$ is fed as input to eighth component 416. In some embodiments, the forward RNN may comprise an LSTM or, alternatively, a GRU that controls how information is passed down from layer to layer of the spoken language understanding system. For example, the LSTM or GRU may control how much information to pass forward and how much information to forget at each time step. Controlling how information is passed down from layer to layer increases the accuracy and efficiency of slot filling, finding the user intent, and classifying the word sequence by providing useful information during each time step while eliminating information that is irrelevant to the respective time step.

As previously mentioned, the spoken language understanding system includes a first softmax classifier and a second softmax classifier. A Softmax function is a known machine-learning process for classifying a set of inputs into distinct classes. Here, the Softmax function is used by the first softmax classifier and the second softmax classifier to determine the intent and the dialogue act category, respectively, as discussed below.

The spoken language understanding method may include outputting the forward RNN output to the first softmax classifier and the second softmax classifier. As previously mentioned, the spoken language understanding method may include processing the forward RNN output through the first softmax classifier to determine an intent related to the word sequence. The first softmax classifier may receive the decoded output of each component of the forward RNN and generate the intent class label from the decoded output. For example, as shown by arrows in the embodiment of FIG. 4, the output from each of ninth component 420, tenth component 422, eleventh component 424, and twelfth component 426 are input into first softmax classifier 428. Then, first softmax classifier 428 uses this input to generate an output, which is a hidden state representation (or intent decoder state representation $S_i$) of the intent class label (represented by I in FIG. 4). In some embodiments, the intent decoder state is scalar, and is a function of the shared initial decoder state representation $S_0$, which encodes information of the entire word sequence and the context vector C, which indicates part of the source sequence that the intent decoder pays attention to.

In embodiments with only one intent, the initial decoder state representation $S_0$ may be the only state included because the decoder has only a single state. In such a case, $S_1 = f_{int}(S_0, C)$, in which $S_0$ is set to the last encoder state, $h_T$, arbitrarily. In other embodiments, multiple intents may be generated. For example, a user may say, "I'm interested in flight schedules and ground transportation." In this example, the intents may be "flights" and "ground transportation." To produce multiple intents, the output may be generated in a manner similar to the generation of the slots during slot filling. For example, probabilities may be used to determine whether the word sequence belongs in each intent class.

As previously mentioned, the spoken language understanding method may include processing the forward RNN output through the second softmax classifier to classify the word sequence into a dialogue act category. The second softmax classifier may receive the decoded output of each component of the forward RNN and classify the word sequence into a dialogue act category. For example, as shown by arrows in the embodiment of FIG. 4, the output from each of ninth component 420, tenth component 422, eleventh component 424, and twelfth component 426 are input into second softmax classifier 430. Then, second softmax classifier 430 uses this input to generate N, the hidden state representation (or dialogue act classification decoder state representation $S_j$) of the category of the word sequence. In other words, second softmax classifier uses this input to classify the word sequence. In some embodiments, the dialogue act classification decoder state is scalar, and is a function of the shared initial decoder state representation $S_0$, which encodes information of the entire word sequence and the context vector C, which indicates part of the source sequence that the dialogue act classification decoder pays attention to. In embodiments with only one dialogue act class, the initial dialogue act classification decoder state representation $S_0$ may be the only state included because the decoder has only a single state. In such a case, $S_1 = f_{dac}(S_0, C)$, in which $S_0$ is set to the last encoder state, $h_T$, arbitrarily.

In some embodiments, the output from the second softmax classifier may be used as additional input into the first softmax classifier. In such a case, when the first softmax classifier is an intent decoder and the second softmax classifier is a dialogue act classification decoder, the dialogue act category of the word sequence determined by the second softmax classifier may be input into the first softmax classifier. As a result, the first softmax classifier can have more context for determining the intent of the word sequence. For example, if the second softmax classifier determines that the dialogue act category of the word sequence is a greeting, then the first softmax classifier may determine that word sequence has no task-related intent. Providing more context to the first softmax classifier can improve the efficiency and accuracy of the first softmax classifier.

In some embodiments, the output from the second softmax classifier may be used as additional input into the forward RNN. In such a case, when the second softmax classifier is a dialogue act classification decoder and the forward RNN is a slot filler, the dialogue act category of the word sequence determined by the second softmax classifier may be input into the forward RNN. As a result, the forward RNN can have more context for determining the slot values of the word sequence. For example, if the second softmax classifier determines that the dialogue act category of the word sequence is a greeting, then the forward RNN may determine that word sequence has no task-related slot values. Providing more context to the forward RNN can improve the efficiency and accuracy of the forward RNN.

In some embodiments, the output from the first softmax classifier may be used as additional input into the forward RNN. In such a case, when the first softmax classifier is an intent decoder and the forward RNN is a slot filler, the dialogue act category of the word sequence determined by the first softmax classifier may be input into the forward RNN. As a result, the forward RNN can have more context for determining the slot values of the word sequence. For example, if the first softmax classifier determines that the intent of the word sequence is to find a flight, then the forward RNN may determine that word sequence has slot values related to finding a flight. Providing more context to the forward RNN can improve the efficiency and accuracy of the forward RNN.

In some embodiments, the bidirectional RNN (encoder) may comprise a stack of multiple RNNs. By using a stack of multiple RNNs, multiple sentences may be captured and processed by the spoken language understanding system at one time. Processing multiple sentences in one process provides more context for the encoder and decoders to work with. For example, if a user says, "I would like to go to Boston from Chicago" in one sentence and then says, "I would like to fly" in the next sentence, these two sentences can be used together to determine that a user would like to fly from Chicago to Boston. In some embodiments, additionally or alternatively, the RNNs on the decoder side may also include a stack of multiple RNNs. Providing more context to the bidirectional RNN can improve the efficiency and accuracy of the bidirectional RNN.

In some embodiments, the spoken language understanding system may process individual characters, in place of or in addition to the words of a word sequence. Processing individual characters can help provide more information to the spoken language understanding system. For example, if the word sequence includes a word such as "Georgetown," the spoken language understanding system can find the sub-word of "town" when processing characters of the word sequence. By recognizing the word "town," the spoken language understanding system can determine that "Georgetown" is a city. Providing more information to the spoken language understanding system can improve the efficiency and accuracy of the spoken language understanding system.

Training the system for spoken language understanding is based on the supervised learning paradigm, which involves providing annotated training corpora to the bidirectional RNN. The annotated corpora may be passed along from the bidirectional RNN to the forward RNN, the first softmax classifier, and the second softmax classifier. The annotated training corpora may include dialog-based data with the annotations for the dialogue act classifier, intent classifier, and slot values. As discussed in more detail below, the annotated training corpora are employed to train the spoken language understanding system. The input provided for training may include a user utterance along with the corresponding desired slot, intent, and dialog act category labels. During training, the method 500, discussed above, may be performed using known word sequences with the added steps of calculating error (i.e., the difference between the desired output and the actual output), minimizing the resultant cost (or error) function corresponding to each of the three functions, and back-propagating the resultant costs to the encoder. These added steps help optimize the parameters of the above-discussed equations used to perform the method for spoken language understanding.

Figure 6:
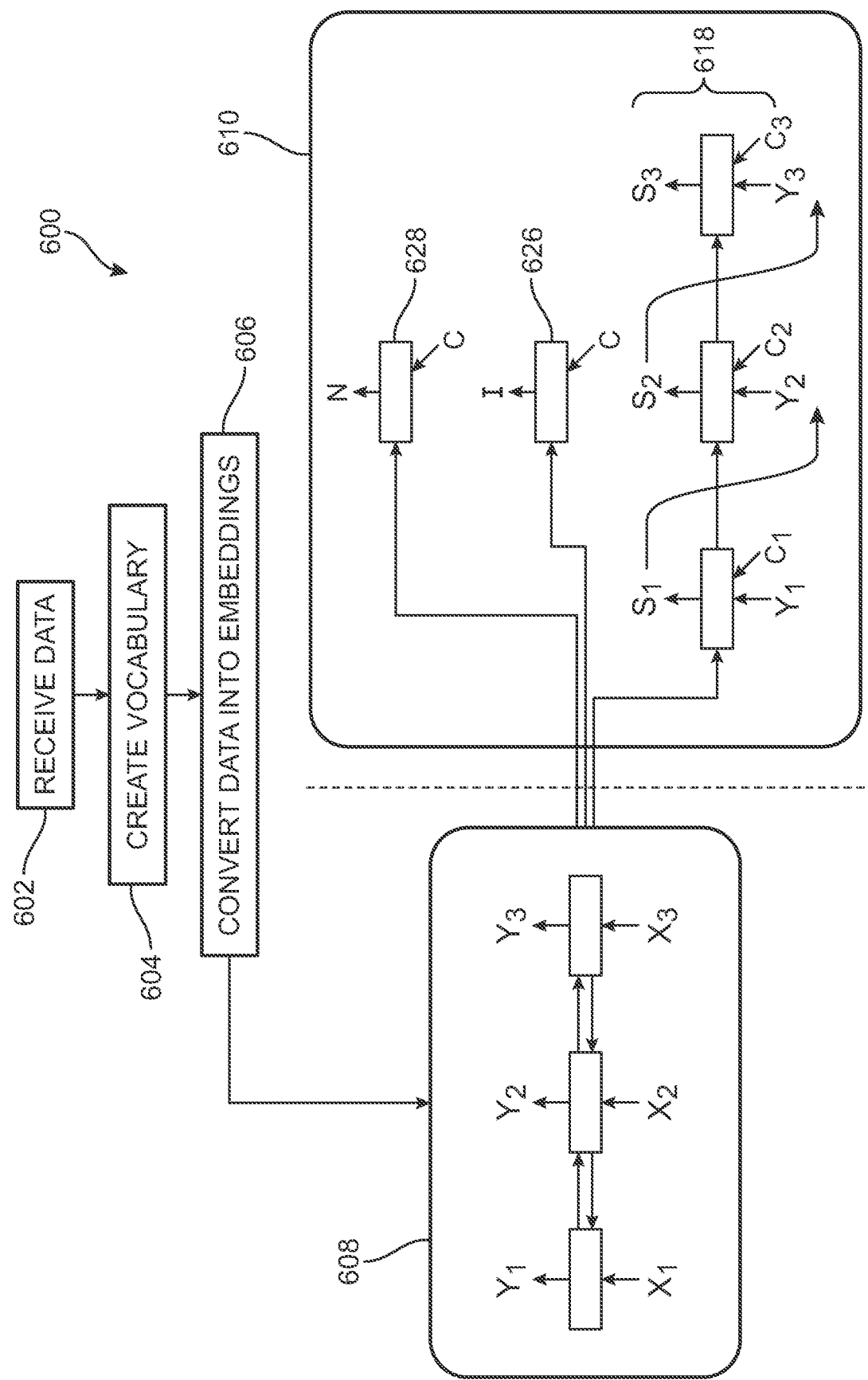
FIG. 6 is a schematic diagram of an embodiment of a training process for a spoken language understanding system.

FIG. 6 is a schematic diagram of an embodiment of a training process 600 for a spoken language understanding system. The training process may include receiving data. For example, as the embodiment of FIG. 6 shows, training process 600 includes a step 602 of receiving data. The training process may include creating a vocabulary. For example, as the embodiment of FIG. 6 shows, training process 600 includes a step 604 of creating a vocabulary. Creating a vocabulary may involve providing a list of words that are likely to be received by the spoken language understanding system during use. For example, the words may include those common to the processes an associated virtual agent is configured to perform. The training process may include converting data into embeddings. For example, as the embodiment of FIG. 6 shows, training process 600 includes a step 606 of converting data into embeddings. Converting the data into embeddings may involve creating relationships between the words in the vocabulary by mapping words to a vector in a high-dimensional space. These word embeddings can learn semantic and syntactic information of the words i.e., similar words are close to each other in this space and dissimilar words far apart.

The embeddings can be input into a bidirectional RNN (encoder). For example, as the embodiment of FIG. 6 shows, the embeddings from step 606 are input into a bidirectional RNN (encoder) 608, which passes the embeddings along to a group of decoders 610, including a dialogue act classifier 628, an intent classifier 626, and a forward RNN 618.

As part of training, method steps discussed above with respect to FIG. 5 can be performed for a first known word sequence from the training corpora that has been provided to spoken language understanding system. Then, the error can be calculated based on the difference between the expected (or desired) output and the actual output. The expected output may include at least one of expected slot information, an expected intent, and an expected dialogue act category. For example, the expected output may include each of the expected slot information, the expected intent, and the expected dialogue act category. The actual output may include at least one of the intent, dialogue act category, and slot information determined when the spoken language understanding system processes the first known word sequence.

The cost (or error) functions derived from the errors corresponding to each of the three functions of: (1) classifying a user's speech act into a dialogue act category, (2) identifying a speaker's intent, and (3) slot filling may be minimized using a Stochastic Gradient Descent ("SGD") algorithm, such as the AdamOptimizer method. During training, the costs from all three of the decoders can be back-propagated to the encoder. For example, in the embodiment shown in FIG. 6, the costs from each of dialogue act classifier 628, intent classifier 626, and forward RNN 618 are back-propagated to bidirectional RNN (encoder) 608. Back-propagation may include using the errors to update parameters of the spoken language understanding system. For example, the parameters may include a value of the context vector. In another example, the parameters may include one or more of (a) a slot weight associated with using the forward RNN output to generate actual slot information, (b) an intent weight associated with processing the forward RNN output through a first softmax classifier to determine the actual intent related to the word sequence, and (c) a dialogue act category weight associated with processing the forward RNN output through a second softmax classifier to determine the actual dialogue act category related to the word sequence. The parameters/values to be learned and updated during the training step, include: The a's, the e's, the attention C's, the parameters corresponding to the three f's (for dialog act category, intent and slot), and the parameters associated with the Bi-directional RNN and the forward RNN.

After using the error to update parameters of the spoken language understanding system, the method steps discussed above with respect to FIG. 5 can be performed for a second known word sequence and a new error can be calculated and used to adjust parameters of the spoken language understanding system. After repeating this training process with different known word sequences, the entire parameter set of the joint neural model of the system and method for spoken language understanding can be optimized. Training the three above-mentioned functions jointly in this manner is at least two to three times faster than training a system that trains the three functions separately.

The training can be terminated when a termination criterion is met. In some embodiments, the termination criterion may be that each of the costs (or errors) has fallen below a preset threshold. In some embodiments, the termination criterion may be that the number of iterations has exceeded a preset limit.

If after the termination of training, the errors for each of the decoders remain above the respective thresholds, then the values of some of the hyperparameters (e.g., number of hidden units, etc.) may be adjusted and the entire training procedure can be repeated. If, on the other hand, one or two of the errors were below the respective thresholds, then the setup could still be deployed by limiting the use to only the functions having errors below the thresholds. In this manner, the decoders could be run separately or two decoders could be run jointly. Alternatively, as stated above, the hyperparameter values could be changed and the training procedure repeated. Additionally, in some embodiments, the setup is provided also with flags for selective training and operation of only one or two decoders at a time.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of using a spoken language understanding system, comprising:
   receiving a word sequence, including a first word and a second word provided in a forward direction in which the first word comes before the second word;
   processing the word sequence through a bidirectional recurrent neural network ("RNN") to generate a bidirectional RNN output, including a forward hidden state representation and a backward hidden state representation for each word of the word sequence;
   applying a context vector to the bidirectional RNN output to generate a weighted bidirectional RNN output;
   processing the weighted bidirectional RNN output through a forward RNN to generate forward RNN output;
   using the forward RNN output to generate actual slot information, including slot names and slot values related to the word sequence;
   processing the forward RNN output through a first softmax classifier to determine an actual intent related to the word sequence; and
   processing the forward RNN output through a second softmax classifier to determine an actual dialogue act category related to the word sequence.

2. The method of claim 1, wherein generating the actual slot information occurs jointly with processing the forward RNN output through both the first softmax classifier and the second softmax classifier.

3. The method of claim 1, wherein the forward RNN includes a first forward RNN component output,
   wherein the bidirectional RNN includes a first bidirectional RNN component and a second bidirectional RNN component, and
   wherein the first forward RNN component output is input into the second bidirectional RNN component.

4. The method of claim 3, wherein the forward RNN includes a second forward RNN component output,
   wherein the bidirectional RNN includes a third bidirectional RNN component, and
   wherein the second forward RNN component output is input into the third bidirectional RNN component.

5. The method of claim 1, wherein at least one of the forward RNN and the bidirectional RNN includes one of a long short-term memory ("LSTM") and a gated recurrent unit ("GRU") that controls how information is passed down from layer to layer of the spoken language understanding system.

6. The method of claim 1, further comprising:
   training the spoken language understanding system by:
      providing annotated training corpora to the bidirectional RNN, wherein the annotated training corpora provides an expected output including at least one of expected slot information, an expected intent, and an expected dialogue act category;
      calculating an error based on the difference between the expected output and an actual output, wherein the actual output includes at least one of the actual slot information, the actual intent, and the actual dialogue act category; and
      using the error to update a value of the context vector.

7. The method of claim 6, wherein training the spoken language understanding system further comprises:
   using the error to update at least one of (a) a slot weight associated with using the forward RNN output to generate actual slot information, (b) an intent weight associated with processing the forward RNN output through a first softmax classifier to determine the actual intent related to the word sequence, and (c) a dialogue act category weight associated with processing the forward RNN output through a second softmax classifier to determine the actual dialogue act category related to the word sequence.

8. The method of claim 7, wherein calculating the error based on the difference between the expected output and the actual output includes calculating at least one of (a) a slot error based on the difference between the expected slot information and the actual slot information, (b) an intent error based on the difference between the expected intent and the actual intent, and (c) an intent error based on the difference between the expected dialogue act category and the actual dialogue act category.

9. A non-transitory computer-readable medium storing software comprising instructions executable by one or more computers which, upon such execution, cause the one or more computers to use a spoken language understanding system to:
receive a word sequence, including a first word and a second word provided in a forward direction in which the first word comes before the second word;
process the word sequence through a bidirectional recurrent neural network ("RNN") to generate a bidirectional RNN output, including a forward hidden state representation and a backward hidden state representation for each word of the word sequence;
apply a context vector to the bidirectional RNN output to generate a weighted bidirectional RNN output;
process the weighted bidirectional RNN output through a forward RNN to generate forward RNN output;
use the forward RNN output to generate actual slot information, including slot names and slot values related to the word sequence;
process the forward RNN output through a first softmax classifier to determine an actual intent related to the word sequence; and
process the forward RNN output through a second softmax classifier to determine an actual dialogue act category related to the word sequence.

10. The non-transitory computer-readable medium storing software of claim 9, wherein generating the actual slot information occurs jointly with processing the forward RNN output through both the first softmax classifier and the second softmax classifier.

11. The non-transitory computer-readable medium storing software of claim 9, wherein the forward RNN includes a first forward RNN component output,
wherein the bidirectional RNN includes a first bidirectional RNN component and a second bidirectional RNN component, and
wherein the first forward RNN component output is input into the second bidirectional RNN component.

12. The non-transitory computer-readable medium storing software of claim 11, wherein the forward RNN includes a second forward RNN component output,
wherein the bidirectional RNN includes a third bidirectional RNN component, and
wherein the second forward RNN component output is input into the third bidirectional RNN component.

13. The non-transitory computer-readable medium storing software of claim 9, wherein at least one of the forward RNN and the bidirectional RNN includes one of a long short-term memory ("LSTM") and a gated recurrent unit ("GRU") that controls how information is passed down from layer to layer of the spoken language understanding system.

14. The non-transitory computer-readable medium storing software of claim 9, wherein the instructions, upon execution, further cause the one or more computers to:
train the spoken language understanding system by:
providing annotated training corpora to the bidirectional RNN, wherein the annotated training corpora provides an expected output including at least one of expected slot information, an expected intent, and an expected dialogue act category;
calculating an error based on the difference between the expected output and an actual output, wherein the actual output includes at least one of the actual slot information, the actual intent, and the actual dialogue act category; and
using the error to update a value of the context vector.

15. A spoken language understanding system, comprising:
one or more computers and one or more storage devices storing instructions that are operable, when executed by the one or more computers, to cause the one or more computers to:
receive a word sequence, including a first word and a second word provided in a forward direction in which the first word comes before the second word;
process the word sequence through a bidirectional recurrent neural network ("RNN") to generate a bidirectional RNN output, including a forward hidden state representation and a backward hidden state representation for each word of the word sequence;
apply a context vector to the bidirectional RNN output to generate a weighted bidirectional RNN output;
process the weighted bidirectional RNN output through a forward RNN to generate forward RNN output;
use the forward RNN output to generate actual slot information, including slot names and slot values related to the word sequence;
process the forward RNN output through a first softmax classifier to determine an actual intent related to the word sequence; and
process the forward RNN output through a second softmax classifier to determine an actual dialogue act category related to the word sequence.

16. The spoken language understanding system of claim 15, wherein generating the actual slot information occurs jointly with processing the forward RNN output through both the first softmax classifier and the second softmax classifier.

17. The spoken language understanding system of claim 15, wherein the forward RNN includes a first forward RNN component output,
wherein the bidirectional RNN includes a first bidirectional RNN component and a second bidirectional RNN component, and
wherein the first forward RNN component output is input into the second bidirectional RNN component.

18. The spoken language understanding system of claim 17, wherein the forward RNN includes a second forward RNN component output,
wherein the bidirectional RNN includes a third bidirectional RNN component, and
wherein the second forward RNN component output is input into the third bidirectional RNN component.

19. The spoken language understanding system of claim 15, wherein at least one of the forward RNN and the bidirectional RNN includes one of a long short-term memory ("LSTM") and a gated recurrent unit ("GRU") that controls how information is passed down from layer to layer of the spoken language understanding system.

20. The spoken language understanding system of claim 15, wherein the stored instructions are further operable, when executed by the one or more computers, to cause the one or more computers to:
train a model of the spoken language understanding system by:
providing annotated training corpora to the bidirectional RNN, wherein the annotated training corpora provides an expected output including at least one of expected slot information, an expected intent, and an expected dialogue act category;

calculating an error based on the difference between the expected output and an actual output, wherein the actual output includes at least one of the actual slot information, the actual intent, and the actual dialogue act category; and using the error to update a value of the context vector.

\* \* \* \* \*